US009832363B2

(12) United States Patent
Kikuchi

(10) Patent No.: US 9,832,363 B2
(45) Date of Patent: Nov. 28, 2017

(54) IMAGING APPARATUS, CONTROL METHOD OF IMAGING APPARATUS, AND NON-TRANSITORY STORAGE MEDIUM STORING CONTROL PROGRAM OF IMAGING APPARATUS

(71) Applicant: Olympus Corporation, Hachioji-shi, Tokyo (JP)

(72) Inventor: Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 15 days.

(21) Appl. No.: 15/153,622

(22) Filed: May 12, 2016

(65) Prior Publication Data

US 2016/0337578 A1    Nov. 17, 2016

(30) Foreign Application Priority Data

May 14, 2015   (JP) ................................ 2015-099078

(51) Int. Cl.
| | |
|---|---|
| H04N 5/228 | (2006.01) |
| H04N 5/222 | (2006.01) |
| H04N 5/232 | (2006.01) |
| H04N 5/235 | (2006.01) |
| H04N 7/01 | (2006.01) |
| H04N 5/347 | (2011.01) |

(52) U.S. Cl.
CPC ....... *H04N 5/23212* (2013.01); *H04N 5/2353* (2013.01); *H04N 5/23293* (2013.01); *H04N 5/347* (2013.01); *H04N 7/013* (2013.01)

(58) Field of Classification Search
CPC .............. H04N 5/23212; H04N 9/045; H04N 5/23293; H04N 5/2353; H04N 7/013; G02B 7/36
See application file for complete search history.

(56) References Cited

U.S. PATENT DOCUMENTS

| | | | | |
|---|---|---|---|---|
| 9,338,341 | B2* | 5/2016 | Taniguchi | ................ G02B 7/34 |
| 2008/0204587 | A1* | 8/2008 | Takahara | ............... G03B 13/10 |
| | | | | 348/333.01 |

(Continued)

FOREIGN PATENT DOCUMENTS

| | | |
|---|---|---|
| JP | 2013-178564 | 9/2013 |
| JP | 2014-056088 | 3/2014 |

*Primary Examiner* — Trung Diep
(74) *Attorney, Agent, or Firm* — John C. Pokotylo; Pokotylo Patent Services

(57) ABSTRACT

An imaging apparatus includes a reading unit, a display unit, and a control unit. The reading unit reads pixel signals from imaging pixels and focus detection pixels. The display unit displays an image. When both exposure/reading of the imaging pixels and the focus detection pixels are achievable within time corresponding to a display frame rate of the display unit, the control unit controls to alternate the exposure/reading of the imaging pixels and the exposure/reading of the focus detection pixels. When both the exposure/reading of imaging pixels and the focus detection pixels are not achievable within the time, the control unit controls to perform the exposure of the imaging pixels and the focus detection pixels at the same time and read the pixel signals of the imaging pixels and the focus detection pixels after the end of the exposure of the imaging pixels and the focus detection pixels.

15 Claims, 7 Drawing Sheets

(56) References Cited

U.S. PATENT DOCUMENTS

| | | | |
|---|---|---|---|
| 2010/0188532 A1* | 7/2010 | Kusaka | H04N 9/045 348/240.99 |
| 2012/0038810 A1* | 2/2012 | Taniguchi | H01L 27/14621 348/308 |
| 2013/0038757 A1* | 2/2013 | Haneda | H04N 5/3454 348/231.99 |

* cited by examiner

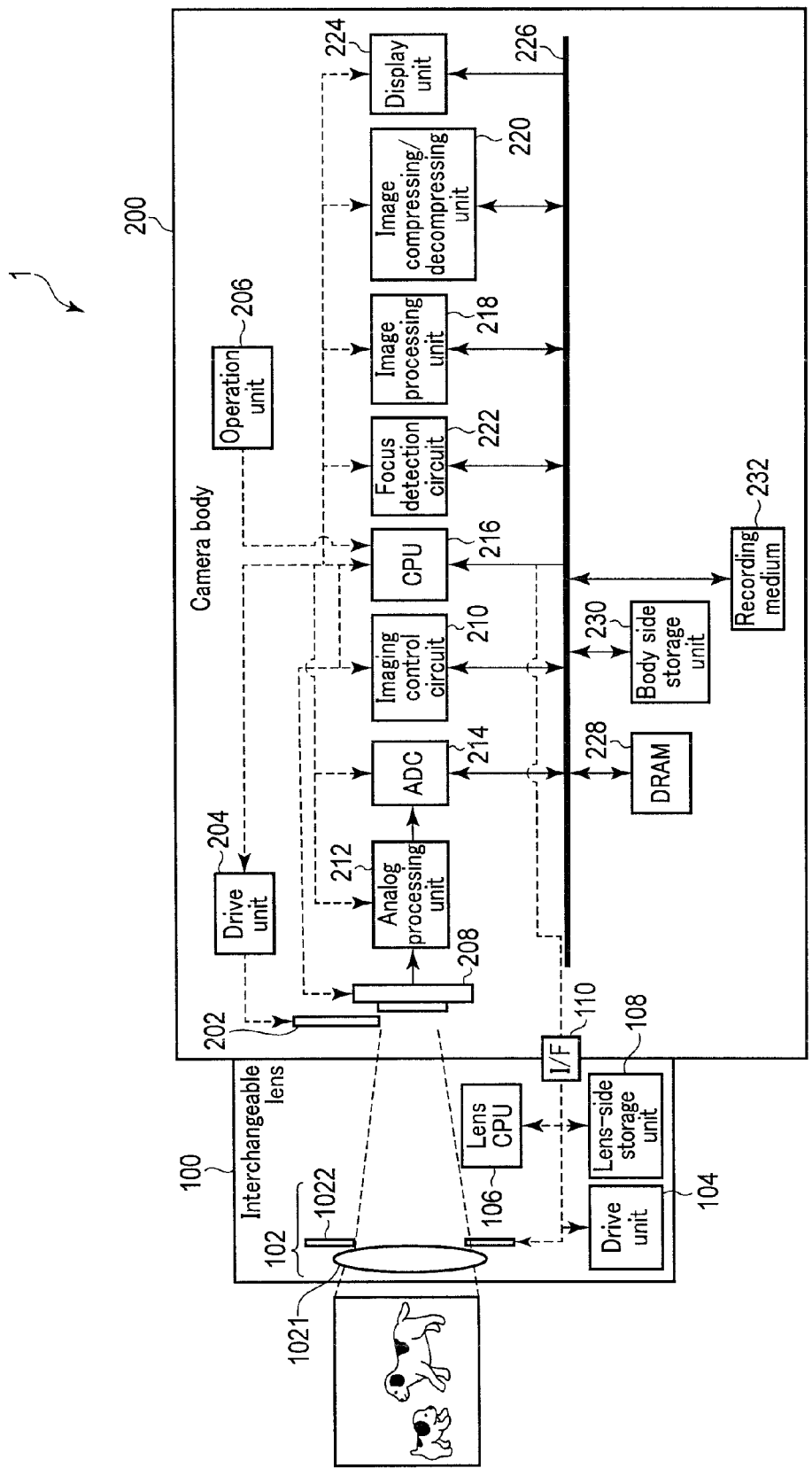
F I G. 1

FIG. 2

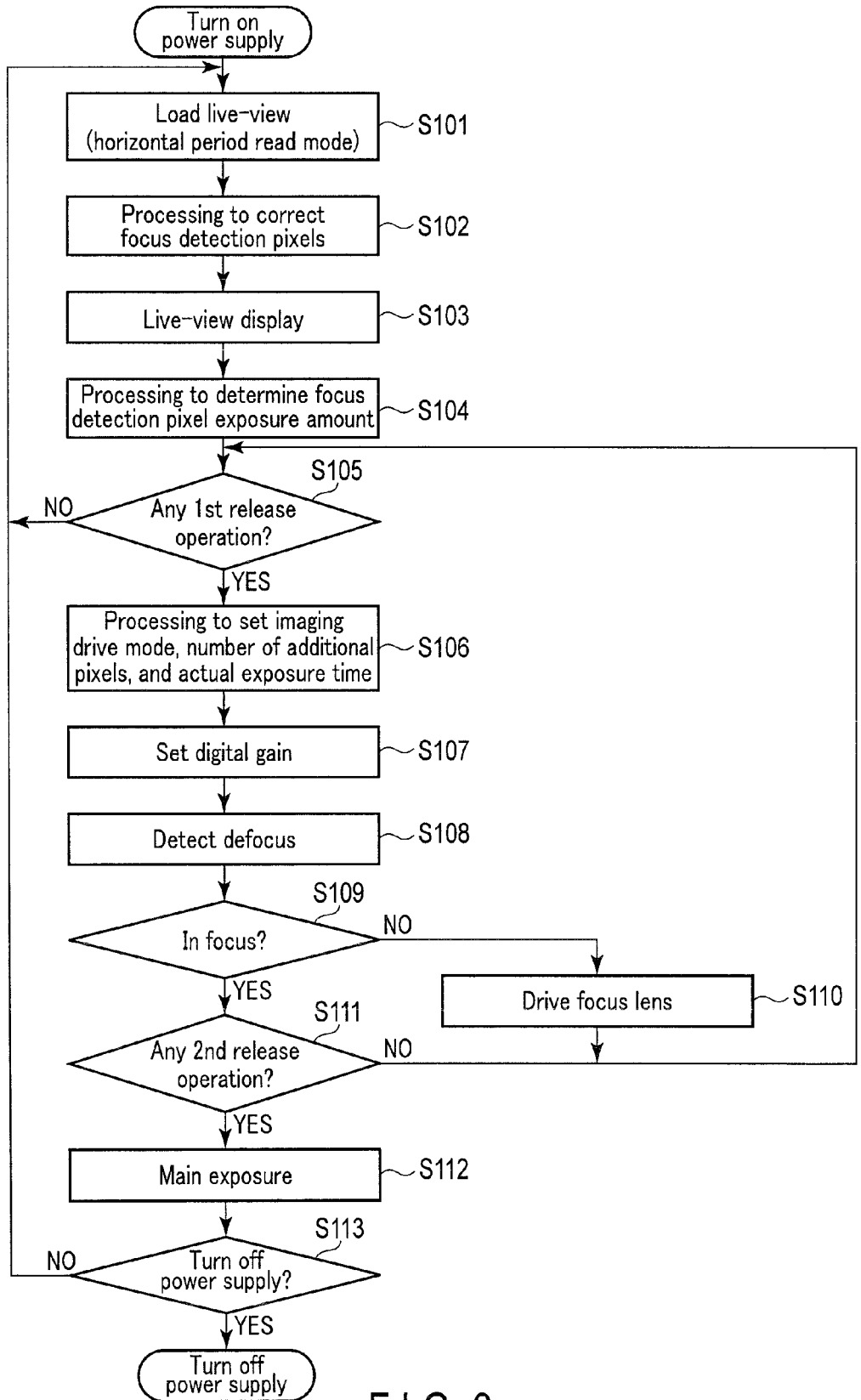
F I G. 3

| Exposure time t [ms] of phase difference pixels | Imaging drive mode, number of additional pixels, and exposure time set for image pickup device | Display frame rate | |
|---|---|---|---|
| 8 ms or less | Alternating reading, 4-pixel addition, exposure time ts set for image pickup device = t | ts ≦ 8ms | ⇑ 60fps |
| 8 ms to 12 ms | Alternating reading, 6-pixel addition, exposure time ts set for image pickup device = t × 4/6 | ts ≦ 8ms | ⇑ 60fps |
| 12 ms to 16 ms | Alternating reading, 8-pixel addition, exposure time ts set for image pickup device = t × 4/8 | ts ≦ 8ms | ⇑ 60fps |
| 16 ms to 33 ms | Alternating reading, 8-pixel addition, exposure time ts set for image pickup device = t × 4/8 | 8ms < ts ≦ 16ms | ⇑ 30fps |
| More than 33 ms | H second half reading, 8-pixel addition, exposure time ts set for image pickup device = t | ts > 16ms | ⇑ 30fps |

F I G. 6

FIG. 7

IMAGING APPARATUS, CONTROL METHOD OF IMAGING APPARATUS, AND NON-TRANSITORY STORAGE MEDIUM STORING CONTROL PROGRAM OF IMAGING APPARATUS

CROSS-REFERENCE TO RELATED APPLICATIONS

This application is based upon and claims the benefit of priority from prior Japanese Patent Application No. 2015-099078, filed May 14, 2015, the entire contents of which are incorporated herein by reference.

BACKGROUND OF THE INVENTION

1. Field of the Invention

The present invention relates to an imaging apparatus, a control method of an imaging apparatus, and a non-transitory storage medium storing a control program of an imaging apparatus.

2. Description of the Related Art

There has been known an imaging apparatus which uses some of pixels of an image pickup device as focus detection elements to detect a focus state. Such an imaging apparatus sets some of pixels of an image pickup device as focus detection elements, forms subject light fluxes which have passed through different pupil areas that are symmetrical with respect to an optical axis center of an imaging lens into an image on focus detection pixels, and detects a phase difference between the subject light fluxes, thereby detecting a focal state of the imaging lens.

Meanwhile, a technique called, for example, live-view display is known in imaging apparatuses. The live-view display is a technique to display images based on a pixel signal obtained in each pixel of an image pickup device on a display unit in real time.

For example, techniques according to Jpn. Pat. Appln. KOKAI Publication No. 2014-56088 and Jpn. Pat. Appln. KOKAI Publication No. 2013-178564 are known as techniques to combine the above live-view display with focus detection. Imaging apparatuses suggested in Jpn. Pat. Appln. KOKAI Publication No. 2014-56088 and Jpn. Pat. Appln. KOKAI Publication No. 2013-178564 alternately read pixel signals from imaging pixels for live-view display and pixel signals from focus detection pixels for focus detection.

BRIEF SUMMARY OF THE INVENTION

According to a first aspect of the invention, there is provided an imaging apparatus which comprises an image pickup device, the image pickup device comprising imaging pixels including light receiving portions and focus detection pixels in which opening positions of light receiving portions are different from opening positions of the imaging pixels, the imaging apparatus comprising: a reading unit which reads pixel signals from the imaging pixels and the focus detection pixels; a display unit which displays an image based on the pixel signals read from the imaging pixels; and a control unit which controls to perform the display of the image on the display unit and a read operation of the pixel signals of the focus detection pixels within a time corresponding to a display frame rate of the display unit, wherein when both exposure of the imaging pixels and reading of the pixel signals of the imaging pixels and exposure of the focus detection pixels and reading of the pixel signals of the focus detection pixels are achievable within the time corresponding to the display frame rate of the display unit, the control unit controls to alternate the exposure of the imaging pixels and the reading of the pixel signals of the imaging pixels and the exposure of the focus detection pixels and the reading of the pixel signals of the focus detection pixels, and when both the exposure of the imaging pixels and the reading of the pixel signals of the imaging pixels and the exposure of the focus detection pixels and the reading of the pixel signals of the focus detection pixels are not achievable within the time corresponding to the display frame rate of the display unit, the control unit controls to perform the exposure of the imaging pixels and the focus detection pixels at the same time and read the pixel signals of the imaging pixels and the pixel signals of the focus detection pixels after the end of the exposure of the imaging pixels and the focus detection pixels.

According to a second aspect of the invention, there is provided a control method of an imaging apparatus which comprises an image pickup device, the image pickup device comprising imaging pixels including light receiving portions and focus detection pixels in which opening positions of light receiving portions are different from opening positions of the imaging pixels, the control method comprising: when both exposure of the imaging pixels and reading of the pixel signals of the imaging pixels and exposure of the focus detection pixels and reading of the pixel signals of the focus detection pixels are achievable within a time corresponding to a display frame rate of a display unit, setting to alternate the exposure of the imaging pixels and the reading of the pixel signals of the imaging pixels and the exposure of the focus detection pixels and the reading of the pixel signals of the focus detection pixels, and when both the exposure of the imaging pixels and the reading of the pixel signals of the imaging pixels and the exposure of the focus detection pixels and the reading of the pixel signals of the focus detection pixels are not achievable within the time corresponding to the display frame rate of the display unit, setting to perform the exposure of the imaging pixels and the focus detection pixels at the same time and read the pixel signals from the imaging pixels and the focus detection pixels so that the pixel signals of the imaging pixels and the pixel signals of the focus detection pixels are read after the end of the exposure of the imaging pixels and the focus detection pixels; performing the exposure of the imaging pixels and the reading of the pixel signals of the imaging pixels and the exposure and reading of the focus detection pixels in accordance with the setting; and displaying an image based on the pixel signals read from the imaging pixels.

According to a third aspect of the invention, there is provided a computer-readable non-transitory storage medium storing a control program of an imaging apparatus which comprises an image pickup device, the image pickup device comprising imaging pixels including light receiving portions and focus detection pixels in which opening positions of light receiving portions are different from opening positions of the imaging pixels, the control program causes a computer to: when both exposure of the imaging pixels and reading of the pixel signals of the imaging pixels and exposure of the focus detection pixels and reading of the pixel signals of the focus detection pixels are achievable within a time corresponding to a display frame rate of a display unit, set to alternate the exposure of the imaging pixels and the reading of the pixel signals of the imaging pixels and the exposure of the focus detection pixels and the reading of the pixel signals the focus detection pixels, and when both the exposure of the imaging pixels and the reading of the pixel signals of the imaging pixels and the exposure of the focus detection pixels and the reading of the pixel signals of the focus detection pixels are not achievable within the time corresponding to the display frame rate of the display unit, set to perform the exposure of the imaging pixels and the focus detection pixels at the same time and read the pixel signals from the imaging pixels and the focus detection pixels so that the pixel signals of the imaging pixels and the pixel signals of the focus detection pixels are read after the end of the exposure of the imaging pixels and the focus detection pixels; perform the exposure of the imaging pixels and the reading of the pixel signals of the imaging pixels and the exposure and reading of the focus detection pixels in accordance with the setting; and display an image based on the pixel signals read from the imaging pixels.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of one example of a camera system according to one embodiment of the present invention;

FIG. 2 is a diagram showing the arrangement of focus detection pixels of an image pickup device as an example;

FIG. 3 is a flowchart showing an AF operation in the camera system;

FIG. 6 is a diagram showing the relation between an exposure time t, imaging drive modes, the number of additional pixels, and an exposure time ts; and FIG. 7 is a diagram illustrating pixel addition.

DETAILED DESCRIPTION OF THE INVENTION

Figure 4:
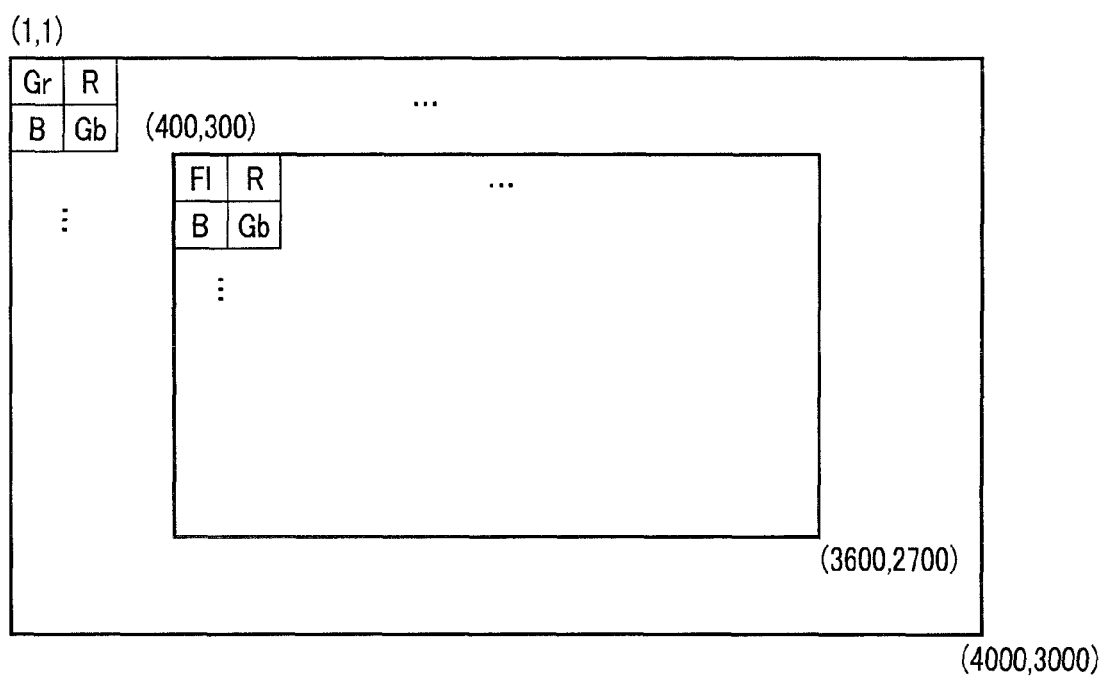
FIG. 4 shows an example of a pixel arrangement in the image pickup device.

An embodiment of the present invention will be described below with reference to the drawings. FIG. 1 is a block diagram showing the configuration of one example of a camera system according to one embodiment of the present invention. In FIG. 1, full lines with arrows indicate the flow of data, and broken lines with arrows indicate the flow of control signals.

A camera system 1 shown in FIG. 1 includes an interchangeable lens 100 and a camera body 200. The interchangeable lens 100 is configured to be attached to and detached from the camera body 200. When the interchangeable lens 100 is attached to the camera body 200, the interchangeable lens 100 is connected to the camera body 200 in communication with each other. The camera system 1 does not necessarily have to be a lens-interchangeable camera. For example, the camera system 1 may be a lens-integrated camera system.

The interchangeable lens 100 includes an imaging lens 102, a drive unit 104, a lens CPU 106, and a lens-side storage unit 108.

The imaging lens 102 is an imaging optical system to form subject light fluxes into an image on an image pickup device 208 of the camera body 200. This imaging lens 102 includes a focus lens 1021 and a diaphragm 1022. The focus lens 1021 is configured to adjust the focal position of the imaging lens 102 by moving in an optical axis direction. The diaphragm 1022 is disposed on the optical axis of the focus lens 1021, and has its aperture that is configured to be variable. The diaphragm 1022 limits the amount of the subject light fluxes which have passed through the focus lens 1021. The drive unit 104 drives the focus lens 1021 and the diaphragm 1022 on the basis of a control signal from the lens CPU 106. The imaging lens 102 may be configured as a zoom lens, in which case the drive unit 104 also performs zoom drive.

The lens CPU 106 is configured to be in communication with a CPU 216 of the camera body 200 via an interface (I/F) 110. This lens CPU 106 controls the drive unit 104 under the control of the CPU 216. The lens CPU 106 also sends information such as an aperture value (F number) of the diaphragm 1022 and lens data stored in the lens-side storage unit 108 to the CPU 216 via the I/F 110.

The lens-side storage unit 108 stores the lens data regarding the interchangeable lens 100. The lens data includes, for example, information on the focal distance of the imaging lens 102 and information on aberration.

The camera body 200 includes a mechanical shutter 202, a drive unit 204, an operation unit 206, the image pickup device 208, an imaging control circuit 210, an analog processing unit 212, an analog/digital converter (ADC) 214, the CPU 216, an image processing unit 218, an image compressing/decompressing unit 220, a focus detection circuit 222, a display unit 224, a bus 226, a DRAM 228, a body side storage unit 230, and a recording medium 232.

The mechanical shutter 202 is configured to be openable and closable, and adjusts the entrance time of the subject light fluxes into the image pickup device 208 from the subject (the exposure time of the image pickup device 208). A known focal plane shutter or lens shutter can be employed as the mechanical shutter 202. The drive unit 204 drives the mechanical shutter 202 on the basis of a control signal from the CPU 216.

The operation unit 206 includes various operational buttons such as an electric power supply button, a release button, a moving image button, a reproduction button, and a menu button, and various operation components such as a touch panel. The operation unit 206 detects the operation states of the various operation components, and outputs a signal indicating a detection result to the CPU 216.

The image pickup device 208 is disposed on the optical axis of the imaging lens 102, in the rear of the mechanical shutter 202, and at a position where the subject light fluxes are formed into an image by the imaging lens 102. The image pickup device 208 is configured so that light receiving portions (e.g. photodiodes) constituting pixels are two-dimensionally arranged. The light receiving portions that constitute the image pickup device 208 generate a charge corresponding to a light receiving amount. The charge generated in the light receiving portions is stored in a capacitor connected to each of the light receiving portions. The charge stored in this capacitor is read as a pixel signal in accordance with a control signal from the imaging control circuit 210. In the present embodiment, the image pickup device 208 is configured so that pixel signals are read row by row.

Figure 2:
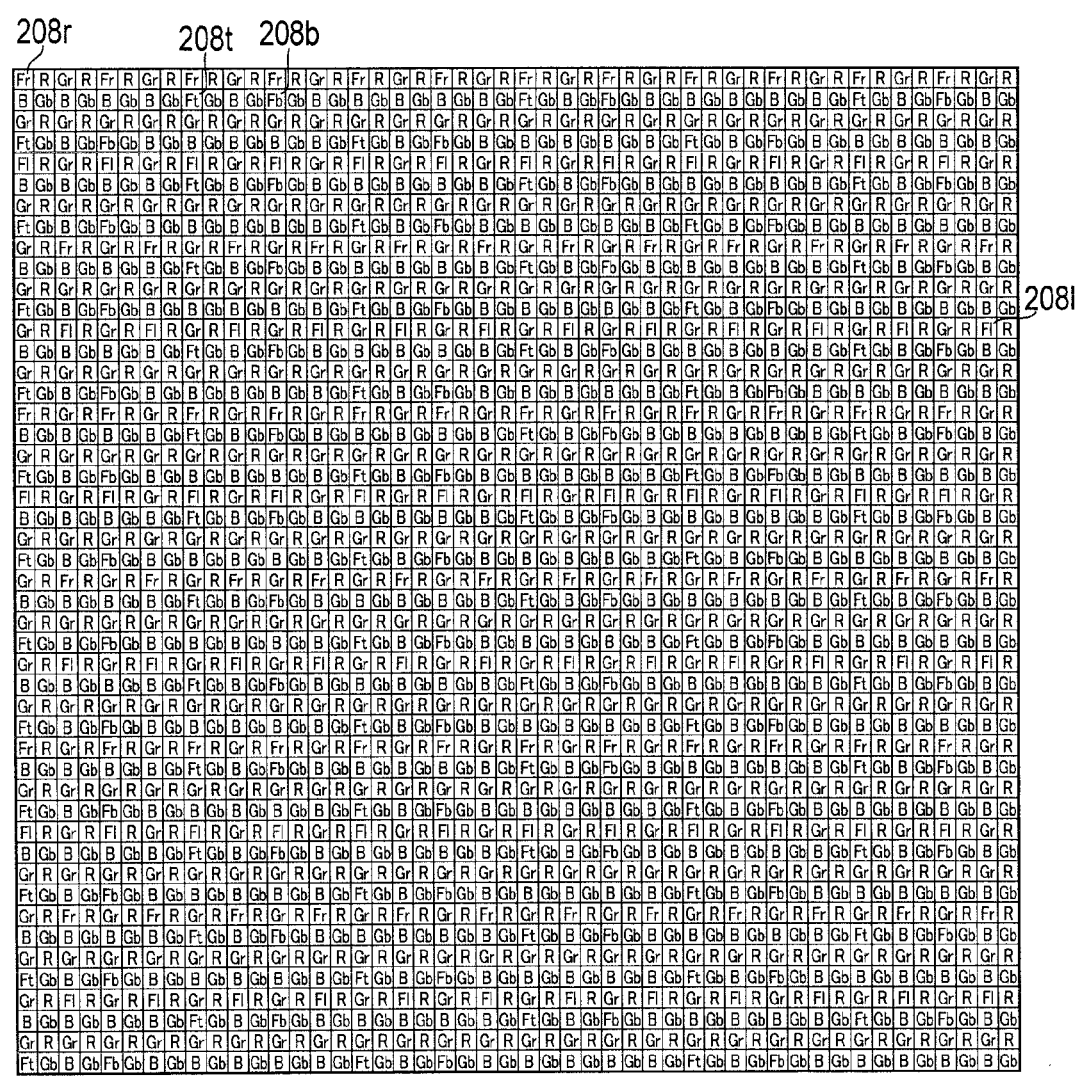

The image pickup device 208 in the present embodiment includes, as pixels, imaging pixels to acquire images for recording and for display, and focus detection pixels for focus detection. The focus detection pixels are pixels in which opening positions of light receiving portions are different from those of the imaging pixels. FIG. 2 is a diagram showing the arrangement of the focus detection pixels of the image pickup device 208 as an example. The color filter arrangement of the image pickup device 208 as an example is a Bayer arrangement. The Bayer arrangement is configured so that filter units each comprising four R, Gr, Gb, and B pixels are two-dimensionally arranged.

In the example of FIG. 2, a horizontal pixel array is formed at the position of a particular Gr pixel. The horizontal pixel array includes a right opening focus detection pixel 208r and a left opening focus detection pixel 208l. The right opening focus detection pixel 208r (indicated as Fr in the drawing) is a pixel in which a region on the left half surface is blocked from light and in which an opening is formed in a region on the right half surface. The left opening focus detection pixel 208l (indicated as Fl in the drawing) is a pixel in which a region on the right half surface is blocked from light and in which an opening is formed in a region on the left half surface. When one horizontal pixel array is seen, the right opening focus detection pixel 208r and the left opening focus detection pixel 208l are located four pixel pitches apart from each other in the horizontal direction and the vertical direction. The horizontal pixel array in an odd row and the horizontal pixel array in an even row are located two pixel pitches apart from each other.

As shown in FIG. 2, a vertical pixel array is formed at the position of a particular B pixel. The vertical pixel array includes a top opening focus detection pixel 208t and a bottom opening focus detection pixel 208b. The top opening focus detection pixel 208t (indicated as Ft in the drawing) is a pixel in which a region on the lower half surface is blocked from light and in which an opening is formed in a region on the upper half surface. The bottom opening focus detection pixel 208b (indicated as Fb in the drawing) is a pixel in which a region on the upper half surface is blocked from light and in which an opening is formed in a region on the lower half surface. In one vertical pixel array, the top opening focus detection pixel 208t and the bottom opening focus detection pixel 208b are located four pixel pitches apart from each other in the horizontal direction and the vertical direction. The vertical pixel array in an odd column and the vertical pixel array in an even column are located two pixel pitches apart from each other. That is, in the example of FIG. 2, the vertical pixel array is disposed at a position in which the horizontal pixel array is rotated 90 degrees.

The imaging control circuit 210 as a reading unit controls the exposure of the image pickup device 208 and the reading of the pixel signals from the image pickup device 208 in accordance with the setting of the reading of the pixel signals from the image pickup device 208. The image pickup device 208 according to the present embodiment is configured to be able to add (or mix) and read pixel signals from pixels of the same color. The imaging control circuit 210 also controls the number of addition of pixel signals of the image pickup device 208.

The analog processing unit 212 performs analog processing such as amplification processing for the pixel signals read from the image pickup device 208 under the control of the imaging control circuit 210. The ADC 214 converts the pixel signal output from the analog processing unit 212 into a pixel signal (pixel data) in a digital format. Hereinafter, in the present specification, a collection of pixel data is referred to as imaging data.

The CPU 216 is a control unit which controls the camera system 1 in accordance with a program stored in the body side storage unit 230. The image processing unit 218 subjects the imaging data to various image processing to generate image data. For example, to record a still image, the image processing unit 218 subjects the imaging data to image processing for still image recording to generate still image data. Similarly, to record a moving image, the image processing unit 218 subjects the imaging data to image processing for moving image recording to generate moving image data. Moreover, at the time of live-view display, the image processing unit 218 subjects the imaging data to image processing for display to generate image data for display. At the time of this live-view display, the image processing unit 218 also performs correction processing for the pixel data from the focus detection pixels. As described above, a part of a region of the focus detection pixel is blocked from light. Therefore, the amount of light decreases in the focus detection pixel. The image processing unit 218 corrects the decrease of the light amount. This correction includes processing to put a gain corresponding to the decrease of the light amount on the pixel data from the focus detection pixel, and interpolation processing that uses the pixel data for the imaging pixels of the same color around the focus detection pixel.

At the time of recording of the image data, the image compressing/decompressing unit 220 compresses image data (still image data or moving image data) generated in the image processing unit 218. At the time of reproduction of the image data, the image compressing/decompressing unit 220 decompresses the image data recorded in the recording medium 232 in a compressed state.

The focus detection circuit 222 acquires the pixel data from the focus detection pixels, and calculates a defocus direction and a defocus amount with regard to the in-focus position of the focus lens 1021 by use of a known phase difference method on the basis of the acquired pixel data. The focus detection circuit 222 calculates a defocus direction and a defocus amount with regard to the in-focus position of the focus lens 1021 in accordance with a phase difference between the pixel data acquired from each right opening focus detection pixel 208r included in the horizontal pixel array and the pixel data acquired from each left opening focus detection pixel 208l. The focus detection circuit 222 also calculates a defocus direction and a defocus amount with regard to the in-focus position of the focus lens 1021 in accordance with a phase difference between the pixel data acquired from each top opening focus detection pixel 208t included in the vertical pixel array and the pixel data acquired from each bottom opening focus detection pixel 208b.

The display unit 224 is a display unit such as a liquid crystal display or an organic EL display, and is disposed, for example, on the rear surface of the camera body 200. This display unit 224 displays images under the control of the CPU 216. The display unit 224 is used, for example, for the live-view display or for the display of recorded images.

The bus 226 is connected to the ADC 214, the CPU 216, the image processing unit 218, the image compressing/decompressing unit 220, the focus detection circuit 222, the DRAM 228, the body side storage unit 230, and the recording medium 232, and functions as a transfer path to transfer various data generated in these blocks.

The DRAM 228 is an electrically rewritable memory, and temporarily stores various data such as the above-mentioned imaging data (pixel data), image data for recording, image data for display, and processed data in the CPU 216. An SDRAM may be used for transitory storage.

The body side storage unit 230 stores programs used in the CPU 216, and various data such as adjustment values of the camera body 200.

The recording medium 232 is configured to be incorporated or attached in the camera body 200, and records the image data for recording as an image file in a predetermined format.

An AF operation in the camera system 1 according to the present embodiment is described below. FIG. 3 is a flowchart showing the AF operation in the camera system 1. Processing in the flowchart shown in FIG. 3 is executed by the CPU 216 on the basis of the program stored in the body side storage unit 230. Before the explanation of the AF operation in the camera system 1, the pixel arrangement in the image pickup device 208 is defined as shown in FIG. 4. The image pickup device 208 described in the following example has pixels in a range A of 4000 pixels×3000 pixels. Coordinates of the pixel at the upper left end are (1, 1), and coordinates of the pixel at the lower right end are (4000, 3000). The focus detection pixels are arranged in a range B in which coordinates at the upper left end are (4000, 300) and coordinates at the lower right end are (3600, 2700) as illustrated in FIG. 2.

The processing in the flowchart shown in FIG. 3 is started, for example, when the power supply of the camera body 200 is turned on. In step S101, the CPU 216 loads image data for live-view in a horizontal period second half read mode. The image pickup device 208 in the present embodiment has an alternating read mode and the horizontal period second half read mode as imaging drive modes.

Figures 5A, 5B:
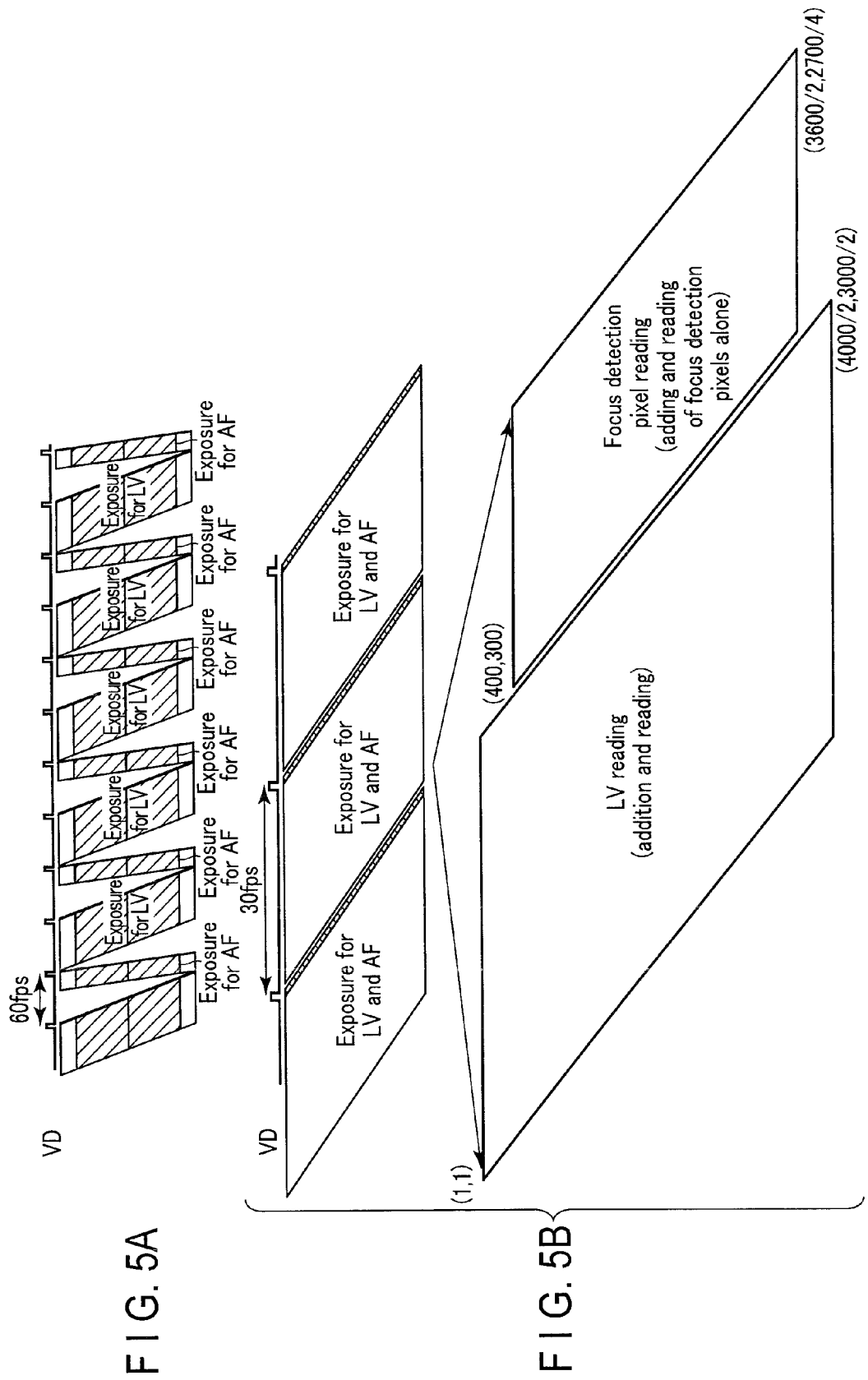
FIG. 5A is a diagram illustrating an alternating read mode.
FIG. 5B is a diagram illustrating a horizontal period second half read mode.

The alternating read mode is an imaging drive mode to separately perform exposure and reading for live-view (LV) and exposure and reading for focus detection (AF) as shown in FIG. 5A. In the alternating read mode, both the exposure for LV and the exposure for AF are performed during a period corresponding to a display frame rate of the live-view display (e.g. 1/30 seconds when a display frame rate is 30 fps). In the exposure for LV, the imaging control circuit 210 adds and reads pixel signals of adjacent pixels of the same color (e.g. 4 pixels of horizontal 2 pixels×vertical 2 pixels) among pixels which have finished exposure. In contrast, in the exposure for AF, the imaging control circuit 210 only adds and reads pixel signals from the focus detection pixels which have finished exposure. In such an alternating read mode, exposure times can be separately set in the exposure for LV and the exposure for AF.

The horizontal period read mode is a drive mode to simultaneously perform the exposure for live-view (LV) and the exposure for focus detection (AF) as shown in FIG. 5B. In the horizontal period second half read mode, the imaging control circuit 210 adds and reads pixel signals of the imaging pixels as in the alternating read mode. The imaging control circuit 210 temporarily holds pixel signals of the focus detection pixels in a line memory, and adds and reads the pixel signals of the focus detection pixels of the same opening in the pixel signals of the focus detection pixels from the line memory after reading the pixel signals of the imaging pixels (in the second half of the horizontal period). Such a horizontal period read mode enables the frame rate to be higher. In the present embodiment, until a 1st release operation is performed, priority is given to the maintaining of the frame rate of display, so that exposure is performed in the horizontal period read mode. Although the pixel signals of the focus detection pixels are read after the pixel signals of the imaging pixels are read, the pixel signals of the imaging pixels may be read after the pixel signals of the focus detection pixels are read in reverse order.

In step S102, the image processing unit 218 performs correction processing for the pixel data from the focus detection pixels. As a result of this correction processing, the pixel data from the focus detection pixels can be used in a manner similar to the pixel data from the imaging pixels. After the correction processing, the image processing unit 218 performs other processing necessary for the generation of image data for display to generate the image data for display.

In step S103, the CPU 216 performs live-view display. The CPU 216 causes the display unit 224 to display live-view images on the basis of the image data for display generated in the image processing unit 218.

In step S104, the CPU 216 decides an exposure amount (exposure time t [ms]) of the focus detection pixels. The exposure time t [ms] of the focus detection pixels is decided by subject luminance. The exposure time t is an exposure time that is needed so that a contrast value of the focus detection pixels calculated on the basis of the subject luminance (a difference of pixel values between adjacent focus detection pixels) will be a predetermined contrast value adequate to perform phase difference AF. If the contrast value adequate to perform the phase difference AF is, for example, intermediate luminance (an intermediate value right between the minimum luminance and the maximum luminance), a predetermined contrast value adequate to perform the phase difference AF is a contrast value of 512 when AD conversion resolution of the pixel signals is 10 bits. The exposure time t in this case is calculated on the basis of (Equation 1) below. An exposure time t1 in the following equation is calculated on the basis of the subject luminance at the time of the live-view display.

Exposure time $t$=exposure time $t1$ for live-view× [512/contrast value] (Equation 1)

The phase difference AF can no longer be performed not only when the contrast is low but also when the focus detection pixels are saturated. Therefore, to decide the exposure time t, it is also necessary to satisfy the condition that "the maximum value of the pixel data for the focus detection pixels after the elapse of the exposure time t×[512/contrast value] is not more than the maximum value (1023 when the AD conversion resolution is 10 bits) of an AD conversion range.

In step S105, the CPU 216 determines whether the 1st release operation has been performed by a user. The 1st release operation is, for example, an operation to press a release button halfway. When it is determined in step S105 that the 1st release operation has not been performed, the processing returns to step S101. When it is determined in step S105 that the 1st release operation has been performed, the processing proceeds to step S106.

In step S106, the CPU 216 respectively sets, in the imaging control circuit 210, the imaging drive mode, the number of additional pixels, and an exposure time ts which is actually set in the image pickup device 208 during the AF operation. The imaging drive mode, the number of additional pixels, and the actual exposure time are set in accordance with the exposure time t decided in step S104.

FIG. 6 is a diagram showing the relation between the exposure time t, the imaging drive modes, the number of additional pixels, and the exposure time ts. In the example of FIG. 6, when the exposure time t is a relatively short time, the CPU 216 sets the imaging drive mode to the alternating read mode and also sets the number of additional pixels so that the display frame rate of the live-view display is kept at 60 fps. When the exposure time t has become longer and the display frame rate of the live-view display cannot be kept at 60 fps only by the setting of the number of additional pixels, the CPU 216 switches the display frame rate to 30 fps. Moreover, when the display frame rate of the live-view display cannot be kept at 30 fps which is the lowest limit display frame rate while the imaging drive mode is still the alternating read mode, the CPU 216 switches the imaging drive mode to the horizontal period second half read mode. Specific explanations are given below.

For example, when the exposure time t is 8 ms or less, the imaging drive mode is set to the alternating read mode. The number of additional pixels is set to 4-pixel addition. In an example of right opening focus detection pixels and left opening focus detection pixels, 4-pixel addition of the pixel signals of the focus detection pixels is performed by adding the pixel signals of neighboring 4 right opening focus detection pixels included in a range indicated by a reference sign 302 in FIG. 7 and by adding the pixel signals of neighboring 4 left opening focus detection pixels. Light from the same part of the subject basically enters each of the focus detection pixels. The magnitude of pixel signals becomes about 4 times by such 4-pixel addition. In this instance, in the example of FIG. 6, the exposure time ts=t is set. The exposure time ts is 8 ms or less, so that the display frame rate can be kept at 60 fps.

Figure 7:
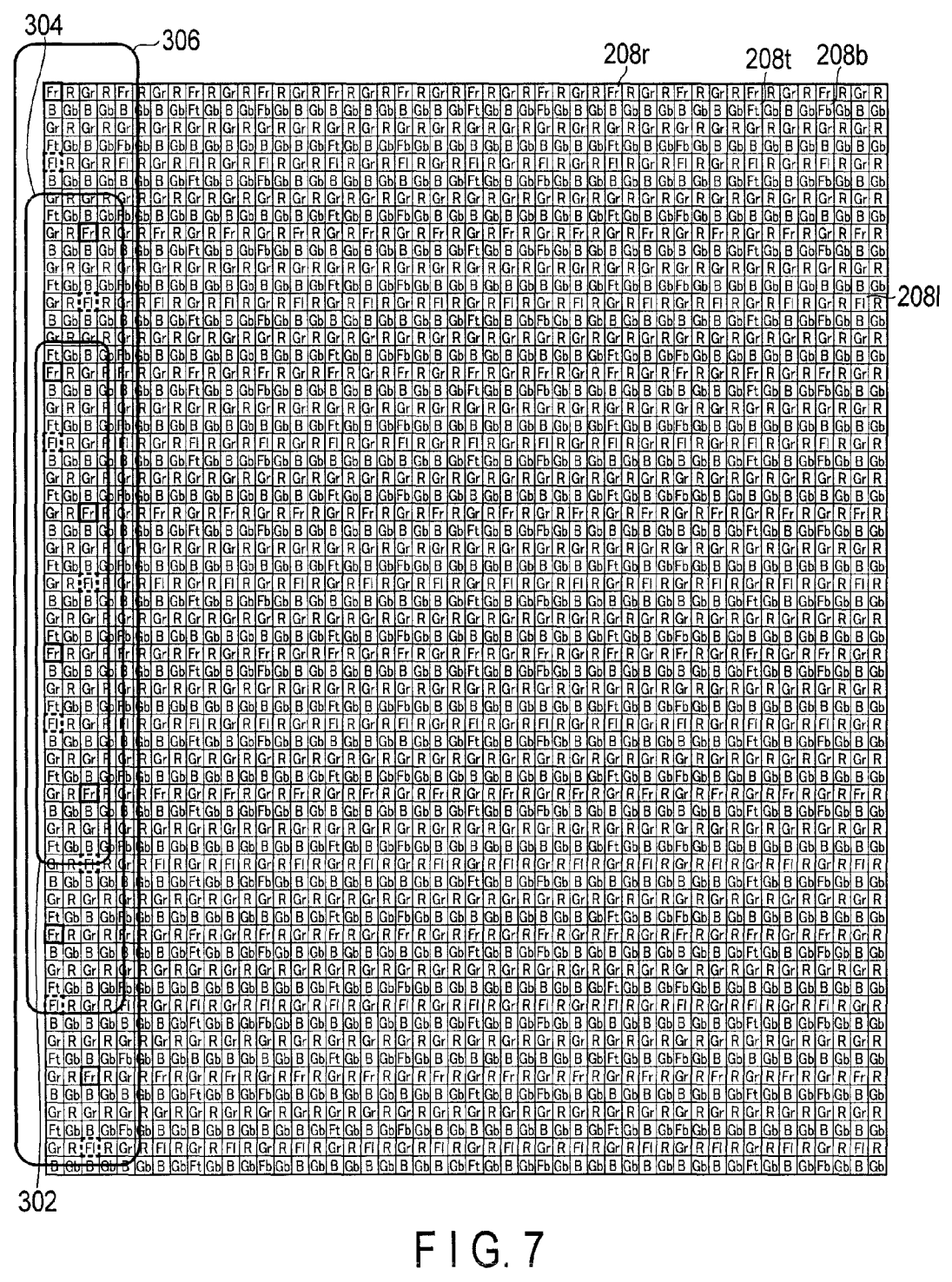

For example, when the exposure time t is 8 ms to 12 ms or less, the imaging drive mode is also set to the alternating read mode. The number of additional pixels is set to 6-pixel addition. In an example of right opening focus detection pixels and left opening focus detection pixels, the pixel signals of neighboring 6 right opening focus detection pixels included in a range indicated by a reference mark 304 in FIG. 7 are added and the pixel signals of neighboring 6 left opening focus detection pixels are added in 6-pixel addition of the pixel signals of the focus detection pixels. The magnitude of the pixel signals becomes about 6 times by such 6-pixel addition. Therefore, the exposure time ts can be reduced to t×4/6. As a result, the exposure time ts becomes 8 ms or less, and the display frame rate can be kept at 60 fps.

For example, when the exposure time t is 12 ms to 16 ms or less, the imaging drive mode is also set to the alternating read mode. The number of additional pixels is set to 8-pixel addition. In an example of right opening focus detection pixels and left opening focus detection pixels, the pixel signals of neighboring 8 right opening focus detection pixels included in a range indicated by a reference mark 306 in FIG. 7 are added, and the pixel signals of neighboring 8 left opening focus detection pixels are added in 8-pixel addition of the pixel signals of the focus detection pixels. The magnitude of the pixel signals becomes about 8 times by such 8-pixel addition. Therefore, the exposure time ts can be reduced to t×4/8. As a result, the exposure time ts becomes 8 ms or less, and the display frame rate can be kept at 60 fps.

For example, when the exposure time t is 16 ms to 33 ms or less, the imaging drive mode is also set to the alternating read mode. The number of additional pixels is set to 8-pixel addition. This is because an error in the focus detection result becomes higher if a further addition is performed. In this case, the exposure time ts can be reduced to t×4/8. However, t is longer than 16 ms, so that the display frame rate is not kept at 60 fps and is switched to 30 fps.

For example, when the exposure time t is more than 33 ms, the imaging drive mode is set to the horizontal period second half read mode. The number of additional pixels is set to 8-pixel addition. In this case, the exposure time increases more than necessary in the alternating read mode, so that the increase of the exposure time is inhibited by the switch to the horizontal period second half read mode. As a result, the display frame rate can be kept at 30 fps.

In step S107, the CPU 216 sets a digital gain for the pixel output of the focus detection pixels. This digital gain is a gain to amplify the pixel signals, for example, when the exposure amount is insufficient even though the exposure time t is more than 33 ms, the imaging drive mode is set to the horizontal period second half read mode, and the number of additional pixels is set to the 8-pixel addition. This gain is calculated on the basis of (Equation 2) below.

Set gain amount=average luminance in the whole scene/average luminance in focus detection area Noise is also amplified if the gain is increased, so that the value of the digital gain is preferably clipped to a proper value. For example, the maximum value of a set gain amount is 2 times. Naturally, this value can be suitably changed. An example of digitally amplifying the pixel signals is shown in step S107. Naturally, the pixel signals may be amplified in an analog manner. In this case, an analog gain is set together with the imaging drive mode and the number of additional pixels in step S106.

In step S108, the focus detection circuit 222 uses the pixel data acquired from the focus detection pixels to calculate a defocus direction and a defocus amount with regard to the in-focus position of the focus lens 1021 by use of a known phase difference method. Exposure at the time of the detection of the defocus amount is performed in accordance with the imaging drive mode, the number of additional pixels, and the exposure time is set in step S106. Therefore, exposure is performed in either the alternating read mode or the horizontal period second half read mode in step S108. When the digital gain has been set, the pixel data from the focus detection pixels is digitally amplified in, for example, the focus detection circuit 222. Moreover, when the digital gain has been set, the pixel signals from the focus detection pixels are amplified in, for example, the analog processing unit 212.

In step S109, the CPU 216 determines whether the focus lens 102l is in focus. Whether the focus lens 1021 is in focus is determined, for example, by determining whether the defocus amount is within a preset allowable range. When it is not determined in step S109 that the focus lens 1021 is in focus, the processing proceeds to step S110. When it not determined in step S109 that the focus lens 1021 is in focus, the processing proceeds to step S111.

In step S110, the CPU 216 sends an instruction to the lens CPU 106 so that the focus lens 1021 is driven in accordance with the defocus direction and the defocus amount. In response to this instruction, the lens CPU 106 drives the focus lens 1021 via the drive unit 104. The processing then returns to step S101.

In step S111, the CPU 216 determines whether a 2nd release operation has been performed by the user. The 2nd release operation is, for example, an operation to fully press the release button. When it is determined in step S111 that the 2nd release operation has not been performed, the processing returns to step S106. When it is determined in step S111 that the 2nd release operation has been performed, the processing proceeds to step S112.

In step S112, the CPU 216 starts the main exposure. The main exposure is exposure processing to acquire imaging data for recording. In the main exposure, the CPU 216 sends a control signal to the imaging control circuit 210. In response to the control signal, the imaging control circuit 210 starts the exposure of the image pickup device 208. After the end of the exposure, the imaging control circuit 210 reads the pixel signal from each pixel of the image pickup device 208. As a result, the imaging data is stored in the DRAM 228. The image processing unit 218 then corrects the pixel output of the focus detection pixels and performs processing to generate other image data for recording. The image compressing/decompressing unit 220 then compresses the image data for recording. The CPU 216 then records the compressed image data for recording in the recording medium 232 as an image file.

In step S113, the CPU 216 determines whether to turn off the power supply of the camera body 200. For example, when the user operates the operation unit 206 to instruct to turn off the power supply or when the user does not operate the operation unit 206 for a predetermined length of time, the CPU 216 determines to turn off the power supply. When it is determined in step S113 not to turn off the power supply of the camera body 200, the processing returns to step S101. When it is determined in step S113 to turn off the power supply of the camera body 200, the processing ends.

As described above, according to the present embodiment, the alternating reading or the horizontal period second half reading is selected depending on the exposure time in the reading of the pixel signals from the focus detection pixels at the time of performing the phase difference AF. Consequently, it is possible to maintain the display frame rate of the live-view display as much as possible and also ensure the accuracy of the phase difference AF. When the exposure time is reduced in the alternating reading and the horizontal period second half reading, it is possible to maintain the display frame rate of the live-view display as much as possible and also ensure the accuracy of the phase difference AF by increasing the number of additional pixels. Furthermore, if the digital or analog gain increase is used together, it is possible to more easily maintain the display frame rate of the live-view display and also improve the accuracy of the phase difference AF.

Each process according to the embodiment described above can be stored as a program executable by, for example, a CPU as a computer. Otherwise, each process can be stored and distributed in a storage medium of an external storage device such as a memory card, a magnetic disk, an optical disk, or a semiconductor memory. The CPU or the like then reads the program stored in the storage medium of the external storage device, and can execute the above-described processes when the operation of the CPU or the like is controlled by the read program.

What is claimed is:

1. An imaging apparatus which comprises an image pickup device, the image pickup device comprising imaging pixels including light receiving portions and focus detection pixels in which opening positions of light receiving portions are different from opening positions of the imaging pixels, the imaging apparatus comprising:
    a reading unit which reads pixel signals from the imaging pixels and the focus detection pixels;
    a display unit which displays an image based on the pixel signals read from the imaging pixels; and
    a control unit which controls to perform the display of the image on the display unit and a read operation of the pixel signals of the focus detection pixels within a time corresponding to a display frame rate of the display unit,
    wherein when both exposure of the imaging pixels and reading of the pixel signals of the imaging pixels and exposure of the focus detection pixels and reading of the pixel signals of the focus detection pixels are achievable within the time corresponding to the display frame rate of the display unit, the control unit controls to alternate the exposure of the imaging pixels and the reading of the pixel signals of the imaging pixels and the exposure of the focus detection pixels and the reading of the pixel signals of the focus detection pixels, and
    when both the exposure of the imaging pixels and the reading of the pixel signals of the imaging pixels and the exposure of the focus detection pixels and the reading of the pixel signals of the focus detection pixels are not achievable within the time corresponding to the display frame rate of the display unit, the control unit controls to perform the exposure of the imaging pixels and the focus detection pixels at the same time and read the pixel signals of the imaging pixels and the pixel signals of the focus detection pixels after the end of the exposure of the imaging pixels and the focus detection pixels.

2. The imaging apparatus according to claim 1, wherein the control unit decides an exposure time of the focus detection pixels in accordance with a contrast value which is calculated on the basis of the pixel signals of the focus detection pixels, and determines in accordance with the decided exposure time whether both the exposure of the imaging pixels and the reading of the pixel signals of the imaging pixels and the exposure of the focus detection pixels and the reading of the pixel signals of the focus detection pixels are achievable within the time corresponding to the display frame rate of the display unit.

3. The imaging apparatus according to claim 2, wherein the control unit sets an exposure time shorter than the decided exposure time for the image pickup device, and sets a gain of the pixel signals of the focus detection pixels in accordance with the shorter exposure time.

4. The imaging apparatus according to claim 2, wherein the reading unit adds and reads the pixel signals of the focus detection pixels, and
    the control unit sets an exposure time shorter than the decided exposure time for the image pickup device, and sets the number of additional pixels of the pixel signals of the focus detection pixels in accordance with the shorter exposure time.

5. The imaging apparatus according to claim 3, wherein the control unit sets an exposure time shorter than the decided exposure time for the image pickup device, and sets a gain of the pixel signals of the focus detection pixels in accordance with the shorter exposure time.

6. A control method of an imaging apparatus which comprises an image pickup device, the image pickup device comprising imaging pixels including light receiving portions and focus detection pixels in which opening positions of light receiving portions are different from opening positions of the imaging pixels, the control method comprising:
    when both exposure of the imaging pixels and reading of the pixel signals of the imaging pixels and exposure of the focus detection pixels and reading of the pixel signals of the focus detection pixels are achievable within a time corresponding to a display frame rate of a display unit, setting to alternate the exposure of the imaging pixels and the reading of the pixel signals of the imaging pixels and the exposure of the focus detection pixels and the reading of the pixel signals of the focus detection pixels, and when both the exposure of the imaging pixels and the reading of the pixel signals of the imaging pixels and the exposure of the focus detection pixels and the reading of the pixel signals of the focus detection pixels are not achievable within the time corresponding to the display frame rate of the display unit, setting to perform the exposure of the imaging pixels and the focus detection pixels at the same time and read the pixel signals from the imaging pixels and the focus detection pixels so that the pixel signals of the imaging pixels and the pixel signals of the focus detection pixels are read after the end of the exposure of the imaging pixels and the focus detection pixels;

performing the exposure of the imaging pixels and the reading of the pixel signals of the imaging pixels and the exposure and reading of the focus detection pixels in accordance with the setting; and displaying an image based on the pixel signals read from the imaging pixels.

7. The control method of the imaging apparatus according to claim 6, wherein the setting comprises deciding an exposure time of the focus detection pixels in accordance with a contrast value which is calculated on the basis of the pixel signals of the focus detection pixels, and determining in accordance with the decided exposure time whether both the exposure of the imaging pixels and the reading of the pixel signals of the imaging pixels and the exposure of the focus detection pixels and the reading of the pixel signals of the focus detection pixels are achievable within the time corresponding to the display frame rate of the display unit.

8. The control method of the imaging apparatus according to claim 7, wherein the setting comprises setting an exposure time shorter than the decided exposure time for the image pickup device, and setting a gain of the pixel signals of the focus detection pixels in accordance with the shorter exposure time.

9. The control method of the imaging apparatus according to claim 7, wherein the setting comprises setting an exposure time shorter than the decided exposure time for the image pickup device, and setting the number of additional pixels of the pixel signals of the focus detection pixels in accordance with the shorter exposure time.

10. The control method of the imaging apparatus according to claim 8, wherein the setting comprises setting an exposure time shorter than the decided exposure time for the image pickup device, and setting a gain of the pixel signals of the focus detection pixels in accordance with the shorter exposure time.

11. A computer-readable non-transitory storage medium storing a control program of an imaging apparatus which comprises an image pickup device, the image pickup device comprising imaging pixels including light receiving portions and focus detection pixels in which opening positions of light receiving portions are different from opening positions of the imaging pixels, the control program causes a computer to:

when both exposure of the imaging pixels and reading of the pixel signals of the imaging pixels and exposure of the focus detection pixels and reading of the pixel signals of the focus detection pixels are achievable within a time corresponding to a display frame rate of a display unit, set to alternate the exposure of the imaging pixels and the reading of the pixel signals of the imaging pixels and the exposure of the focus detection pixels and the reading of the pixel signals the focus detection pixels, and when both the exposure of the imaging pixels and the reading of the pixel signals of the imaging pixels and the exposure of the focus detection pixels and the reading of the pixel signals of the focus detection pixels are not achievable within the time corresponding to the display frame rate of the display unit, set to perform the exposure of the imaging pixels and the focus detection pixels at the same time and read the pixel signals from the imaging pixels and the focus detection pixels so that the pixel signals of the imaging pixels and the pixel signals of the focus detection pixels are read after the end of the exposure of the imaging pixels and the focus detection pixels;

perform the exposure of the imaging pixels and the reading of the pixel signals of the imaging pixels and the exposure and reading of the focus detection pixels in accordance with the setting; and display an image based on the pixel signals read from the imaging pixels.

12. The non-transitory storage medium according to claim 11, wherein the setting comprises determining an exposure time of the focus detection pixels in accordance with a contrast value which is calculated on the basis of the pixel signals of the focus detection pixels, and determining in accordance with the decided exposure time whether both the exposure of the imaging pixels and the reading of the pixel signals of the imaging pixels and the exposure of the focus detection pixels and the reading of the pixel signals of the focus detection pixels are achievable within the time corresponding to the display frame rate of the display unit.

13. The non-transitory storage medium according to claim 12, wherein the setting comprises setting an exposure time shorter than the decided exposure time for the image pickup device, and setting a gain of the pixel signals of the focus detection pixels in accordance with the shorter exposure time.

14. The non-transitory storage medium according to claim 12, wherein the setting comprises setting an exposure time shorter than the decided exposure time for the image pickup device, and setting the number of additional pixels of the pixel signals of the focus detection pixels in accordance with the shorter exposure time.

15. The non-transitory storage medium according to claim 13, wherein the setting comprises setting an exposure time shorter than the decided exposure time for the image pickup device, and setting a gain of the pixel signals of the focus detection pixels in accordance with the shorter exposure time.

* * * * *